Feb. 25, 1936.  H. J. GALEY  2,032,008
APPARATUS FOR CASE HARDENING GLASS
Filed Oct. 13, 1934  3 Sheets-Sheet 2
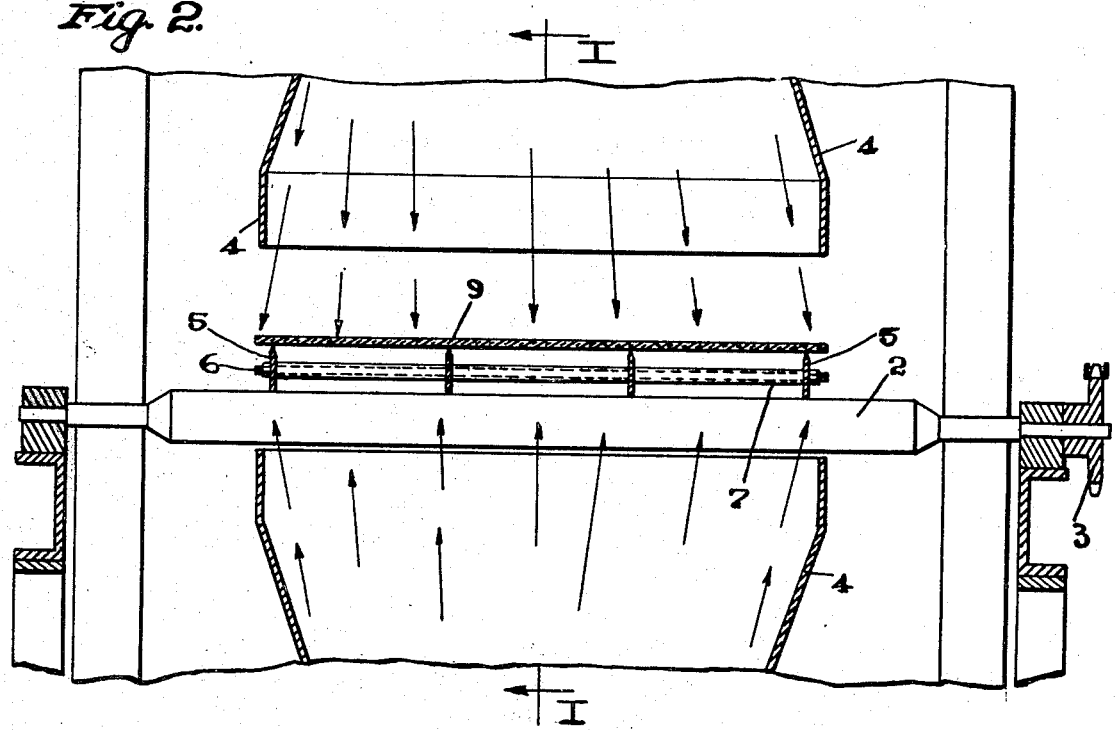
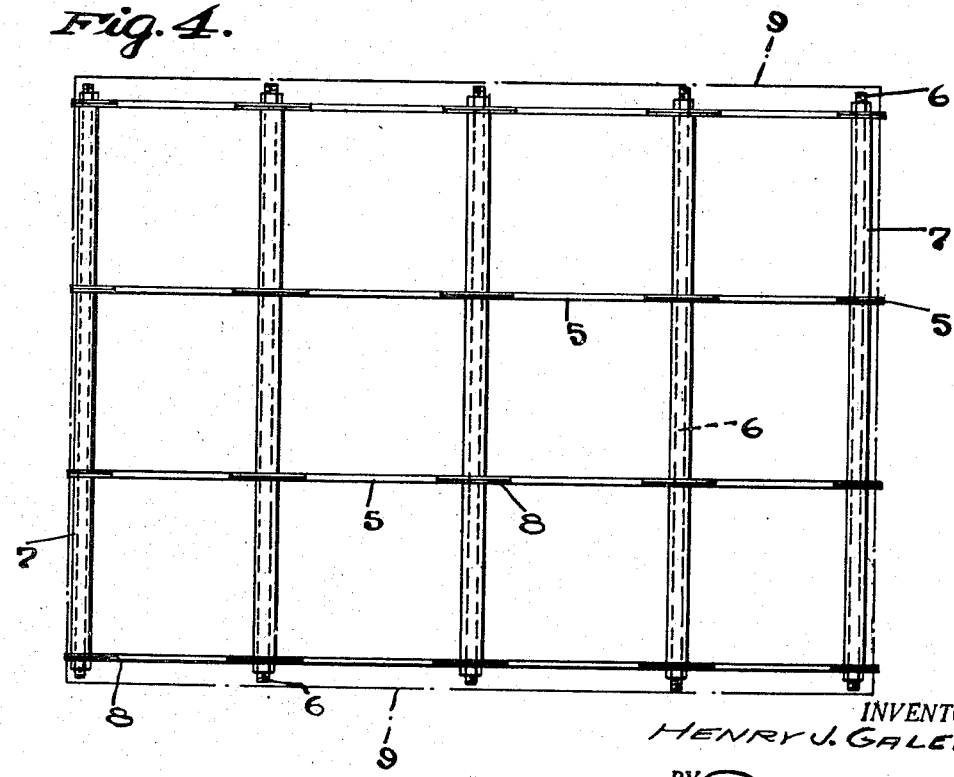
INVENTOR.
HENRY J. GALEY
BY
ATTORNEYS.

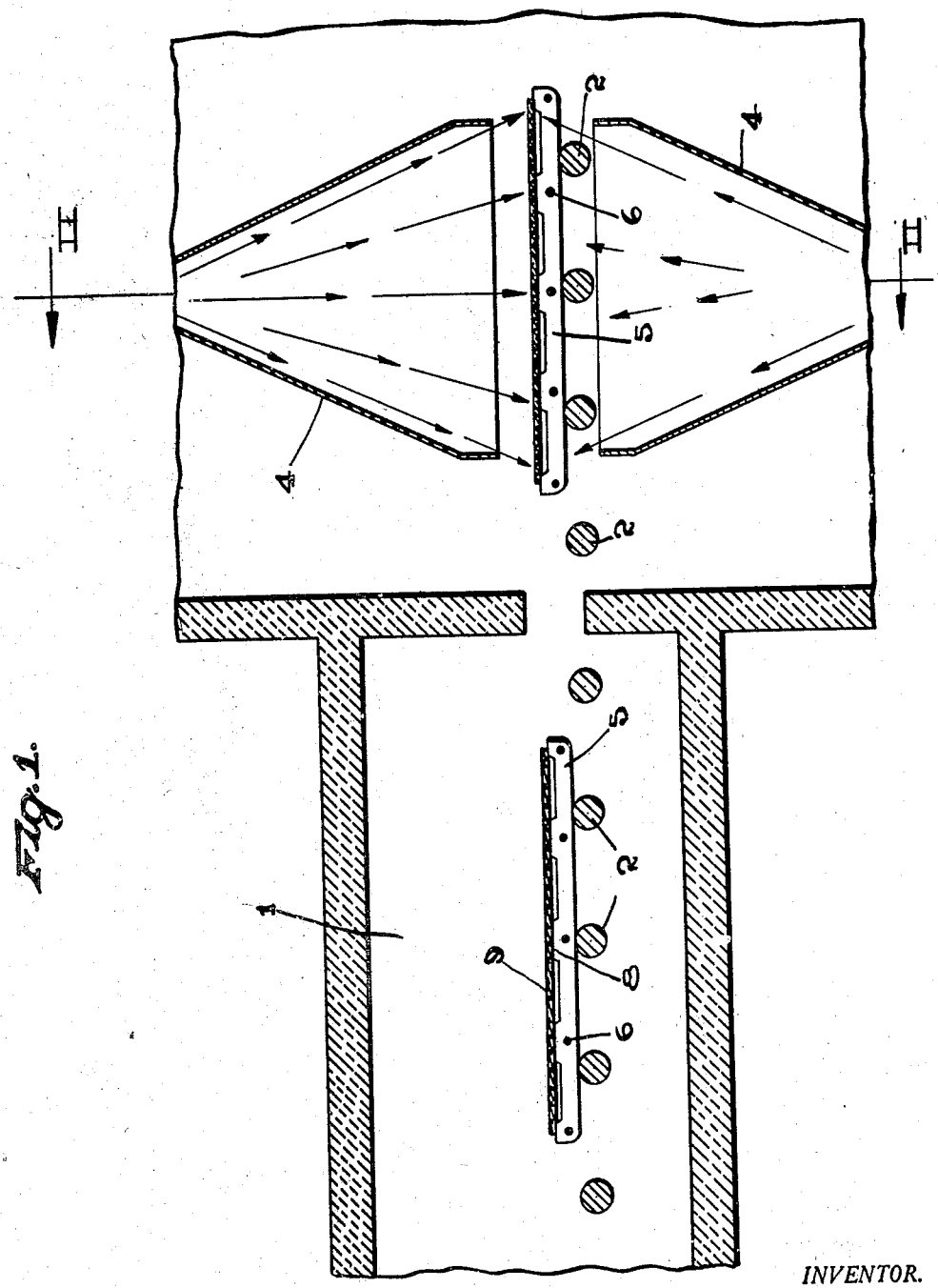

Patented Feb. 25, 1936

2,032,008

UNITED STATES PATENT OFFICE 2,032,008

APPARATUS FOR CASE HARDENING GLASS

Henry J. Galey, Tarentum, Pa., assignor to Pittsburgh Plate Glass Company, a corporation of Pennsylvania Application October 13, 1934, Serial No. 748,237

4 Claims. (Cl. 49—45)

The invention relates to an apparatus for case hardening or tempering glass sheets or plates in order to increase their strength, and is designed particularly for tempering structural glass, such as the well-known opaque carrara glass, but is not limited to use in the production of such glass. Heretofore plate or sheet glass has been subject to the temperature changes necessary to harden it while suspended in a vertical position. This has been regarded as necessary in order to avoid marring the glass and in order to maintain it against distortion, but involves very considerable difficulties in handling, particularly with large sheets, and has in practice required the cutting of recesses in the glass adjacent its upper edge for the application of supporting lips. The present invention has for its main object the avoidance of the difficulties incident to supporting the glass plates in a vertical position, and the provision of an apparatus for handling the glass in a flat or horizontal position during the heating and chilling steps. A further object is the provision of an apparatus by whose use labor required as compared with the vertical method is reduced and any marring of the glass incident to its support is entirely avoided on one face of the plates and reduced to a minimum on the other face. Certain embodiments of the invention are shown in the accompanying drawings, wherein:

Figure 1 is a partial longitudinal section through the apparatus on the line I—I of Fig. 2. Fig. 2 is a transverse section on the line II—II of Fig. 1. Fig. 3 is a perspective view of the grid or rack which supports the glass sheet. Fig. 4 is a plan view of the rack with a glass sheet supported thereon. And Fig. 5 is a fragmentary detail view illustrating a modification.

Referring to the drawings, 1 is a tunnel kiln provided with a runway in the form of the rollers 2, such rollers being provided with sprockets 3 at their ends (Fig. 2) driven by a chain and suitable operating motor, which is not shown. The runway is continued to the right of the kiln and extends between a pair of air distributing boxes 4, 4 of conical shape, to which air is supplied under pressure from suitable blower means not shown.

The racks, which carry the glass plates to be case hardened through the kiln and between the distributing boxes, are preferably constructed as indicated in Fig. 3, being made up of the relatively thin longitudinal bars 5 secured in spaced relation by means of the rods 6 which are surrounded by the pipe sections 7 intermediate the bars in order to provide spacers. This gives a relatively light, rigid grid or frame for carrying the glass plates. In order to reduce the area of contact between the grid and the plate, the bars are provided with the spaced lugs 8 having their upper edges relatively sharp. The area of contact between the grid and the glass plate is thus reduced to a minimum for the reason later pointed out.

In operation, a glass plate 9 is placed upon the grid at the entrance end of the kiln 1 and the rack is carried through the kiln and exposed to gradually increasing temperature, so that when it arrives adjacent the outlet end of the kiln, the glass has a temperature relatively close to the softening point. From the kiln, the rack is moved rapidly into position between the air distributing boxes where the glass is exposed to the chilling action of the air, thus completing the case hardening operation. If desired a multiplicity of air distributing boxes may be employed, and after the glass has been chilled, it passes along the runway to the right where the glass is removed and the rack is returned to the entrance end of the kiln. It will be understood that in the preferred operation the procedure is continuous with the racks or grids carrying the glass sheets following each other through the apparatus in relatively close spaced relation.

The form of the air chilling means may be modified to meet requirements, the invention not being limited to the particular cooling means shown. Any suitable chilling means may be employed for cooling the glass sheets as they pass along the runway, another suitable form being shown in the patent to L. V. Black, No. 1,970,730, dated August 21, 1934. It will also be understood that the form of runway may be modified, the only requirement being that such runway give free access of the air to the glass sheet on the rack when it lies above the lower header 4 since it is desirable to cool the lower face of the glass sheet at the same rate as the upper face, a minimum interference by the conveyor with the flow of air therefor being desirable.

The bars 5 which make up the grid or rack and which contact with the glass sheet are preferably of refractory metal, such as nickel chromium, as such bars have indefinite life and do not warp. Further, the bars shown, being of small mass with poor heat conduction, do not cause breakage by conducting heat rapidly away from the glass at the points of support during the chilling of the glass. In order to reduce the heat conduction from the glass to a minimum, the lugs 8 are formed so that they have a limited area of contact with the glass, this being accomplished by spacing the lugs and making the upper edges relatively sharp.

Fig. 5 illustrates a modification of the rack bars in which the lugs 8 are provided with insulating strips 10 for contacting with the glass. Such strips may be made of lava or asbestos or of wood which become carbonized during the heat treatment. The use of these insulating means reduces the tendency of these lugs to mar the glass during the heat treatment. Other suitable insulating means might be substituted for the materials mentioned.

What I claim is:

1. Apparatus for case hardening a glass plate comprising a heating chamber and a pair of opposing spaced fluid cooling means which discharge vertically, a horizontal runway extending through the chamber and between the cooling means, and a grid lying upon the runway in a horizontal position and adapted to support the glass plate to be tempered.

2. Apparatus for case hardening a glass plate comprising a heating chamber and a pair of opposing spaced fluid cooling means which discharge vertically, a horizontal runway extending through the chamber and between the cooling means, and a grid lying upon the runway in a horizontal position and adapted to support the glass plate, said grid consisting of metal of small mass having only small spaced areas of support for the glass.

3. Apparatus for case hardening a glass plate comprising a heating chamber and a pair of opposing spaced fluid cooling means whch discharge vertically, a horizontal runway extending through the chamber and between the cooling means, and a grid lying upon the runway in a horizontal position and adapted to support the glass plate, said grid consisting of refractory metal of small mass and low heat conductivity having only small spaced areas of support for the glass.

4. Apparatus for case hardening a glass plate comprising a heating chamber and a pair of opposing spaced fluid cooling means which discharge vertically, a horizontal roller runway extending through the chamber and between the cooling means, and a grid lying upon the runway in a horizontal position and adapted to support the glass plate to be tempered.

HENRY J. GALEY.